United States Patent
Shires

[19]

[11] Patent Number: 5,905,778
[45] Date of Patent: *May 18, 1999

[54] NOTIFICATION APPARATUS FOR OUTBOUND DATA COMMUNICATION SYSTEM

[76] Inventor: Mark Richard Shires, 5561 N. Navajo Ave., Glendale, Wis. 53217

[*] Notice: This patent is subject to a terminal disclaimer.

[21] Appl. No.: 09/019,819

[22] Filed: Feb. 6, 1998

[51] Int. Cl.⁶ ............................................. H04M 11/00
[52] U.S. Cl. .......................... 379/93.01; 379/102.02; 379/106.06
[58] Field of Search ................ 379/93.01, 93.09, 379/93.25, 102.01, 102.02, 110.01, 106.06

[56] References Cited

U.S. PATENT DOCUMENTS

| | | | |
|---|---|---|---|
| 3,783,193 | 1/1974 | Lee | 179/2 A |
| 3,876,836 | 4/1975 | Langan | 179/2 A |
| 3,902,016 | 8/1975 | Blouch | 179/2 A |
| 4,085,292 | 4/1978 | Leslar | 179/2 A |
| 4,086,438 | 4/1978 | Skidmore | 179/18 BE |
| 4,126,762 | 11/1978 | Martin | 179/2 A |
| 4,232,195 | 11/1980 | Bartelink | 179/2 A |
| 4,345,113 | 8/1982 | Shelley | 179/2 A |
| 4,355,205 | 10/1982 | Walker | 179/2 A |
| 4,578,534 | 3/1986 | Shelley | 179/2 C |
| 4,654,868 | 3/1987 | Shelley | 379/106 |
| 4,922,521 | 5/1990 | Krikke | 379/95 |
| 4,995,109 | 2/1991 | Arizumi | 379/107 |
| 5,202,916 | 4/1993 | Oliver | 379/106.06 |
| 5,235,634 | 8/1993 | Oliver | 379/106 |
| 5,361,296 | 11/1994 | Reyes | 379/96 |
| 5,416,831 | 5/1995 | Chewning | 379/96 |
| 5,490,210 | 2/1996 | Sasso | 379/100 |
| 5,635,980 | 6/1997 | Lin | 348/13 |

Primary Examiner—Curtis A. Kuntz
Assistant Examiner—Melur Ramakrishnaiah

[57] ABSTRACT

A time independent, data communication system via non-dedicated telephone transmission lines, to remotely notify a local computer to dial out to a data network is disclosed. The local computer dial out is initiated if the telephone connected to the local telephone transmission line is not in use at a predetermined time period, or time range after a predetermined time period, after a ring is detected. In a preferred embodiment, a retriggerable timer is activated by a ring detector circuit. After the timer tines out, if a hook detector circuit detects the telephone transmission line is in an on-hook condition, the local computer dial out is initiated.

12 Claims, 3 Drawing Sheets

NOTIFICATION APPARATUS FOR OUTBOUND DATA COMMUNICATION SYSTEM

BACKGROUND

1. Field of the Invention

The present invention relates generally to telephone data communication systems, and more particularly to time independent data communication systems via non-dedicated telephone transmission lines, to remotely notify a local computer to dial out to a data network.

2. Description of the Prior Art

Various systems are presently known which provide remote notification to local computers or data sets via non-dedicated telephone transmission lines.

In the U.S. Pat. No. 4,085,292 to Leslar (1978) and U.S. Pat. No. 4,232,195 to Bartelink (1980), calls are automatically answered and tones are generated to indicate the condition of the local data set. In the U.S. Pat. No. 3,902,016 to Blouch (1975), U.S. Pat. No. 4,345,113 to Shelley (1982), and U.S. Pat. No. 5,490,210 to Sasso (1996), calls are automatically answered and tones are sensed to selectively activate devices or permit normal telephone operation. In the U.S. Pat. No. 4,086,438 to Skidmore (1978), calls are automatically answered and tones are sensed to selectively dial out to other numbers. In the U.S. Pat. No. 4,922,521 to Krikke (1990), calls are automatically answered by the local computer and the caller transmits an identification number. If the number is authorized, the line is released and the local computer dials back to the caller.

It is preferable that the call is not answered so that there is not an additional charge for the call.

In the U.S. Pat. No. 3,783,193 to Lee (1974), U.S. Pat. No. 3,876,836 to Langan (1975), U.S. Pat. No. 4,654,868 to Shelley (1987), and U.S. Pat. No. 4,995,109 to Arizumi (1991), predetermined sequences of rings are detected to selectively activate devices.

It is preferable to avoid dependence on counts of rings or sequences of rings because it is difficult to precisely determine when to hang up the remotely initiated call to cause a precise number of rings to occur on the local telephone transmission line, particularly if the mechanism is to be used with varied types of transmission line systems, such as geographically diverse public switched telephone networks.

In the U.S. Pat. No. 4,126,762 to Martin (1978), in one embodiment a predetermined time window is utilized. In another embodiment, sequential ringing signals, having a different time spacing than signals from a normal telephone call activate the local data set. In the U.S. Pat. No. 4,355,205 to Walker (1982), a coded signal is transmitted between the first and second ring. In the U.S. Pat. No. 5,361,296 to Reyes (1994), a modem is configured to sense distinctive ring types to perform selective processing of the call. In the U.S. Pat. No. 5,416,831 to Chewning (1995) and U.S. Pat. No. 5,635,980 to Lin (1997), a coded Analog Display Service Interface (ADSI) signal is sensed while the telephone is on-hook to selectively control devices.

It is preferable to avoid dependence on characteristics, such as alternative time-spacing of rings, distinctive ring types or signals sensed or transmitted while on-hook, that may not be available on all telephone transmission line systems, or may only be available at additional cost. It is also preferable that the local computer be accessible at all times, rather than only during a predetermined time window.

In the U.S. Pat. No. 4,578,534 to Shelley (1986), the data set is normally connected and the telephone is normally disconnected. The termination of the ringing signal after a predetermined number of ring bursts causes the data set to begin to communicate with the central computer. If additional ring bursts occur, a non-computer call is sensed and the data set is disconnected and the telephone connected to the telephone transmission line so that normal telephone usage is allowed.

It is preferable to connect the local computer and notification apparatus in parallel with other telephone devices to avoid the need for a particular configuration of telephone transmission line wiring.

In the U.S. Pat. No. 5,235,634 to Oliver (1993), if the number of rings counted on a particular call exceeds a predetermined number of rings, then the device is activated to seize the telephone transmission line, dial the predetermined telephone number and transmit collected data from the site over the telephone transmission line to the central host.

It is preferable to use the subscriber's existing telephone transmission line rather than install a separate dedicated line to provide access to the local device. It is preferable to avoid reliance on a maximum number of rings to avoid interfering with normal use of the subscriber's telephone. If the predetermined number of rings is small, normal telephone calls, as well as those for remote notification purpose, will trigger the device. If the predetermined number of rings is larger, and the subscriber is available, he is likely to answer a remotely initiated call intended only for notification of the local device, and his answering it may preclude the additional rings necessary for triggering the device. If the subscriber is not available but an automatic answering apparatus, such as a telephone answering machine or fax machine, is employed, it may automatically answer a remotely initiated call and preclude the additional rings necessary for triggering the device. It is also preferable to that the remotely initiated call is not answered so that there is not an additional charge for the call.

Accordingly, the need exists for a system that allows a remote notification to a local computer via non-dedicated telephone transmission lines at any time (i.e. no limitation to a time window). Furthermore, such a system should allow normal operation of the telephone. Furthermore, the remotely initiated calls and calls from outside callers should not be answered by the local computer or notification apparatus, to avoid additional charges for calls when the telephone is unanswered by the subscriber, for example. Furthermore, such a system should not rely on counts of rings or sequences of rings because it is difficult to precisely determine when to hang up the remotely initiated call to cause a precise number of rings to occur on the local telephone transmission lines, particularly if the mechanism is to be used with varied types of transmission line systems, such as geographically diverse public switched telephone networks. Furthermore, such a system should not rely on alternative time-spacing of rings, distinctive ring types or signals sensed or transmitted while on-hook, because these features may not be available to all subscribers or may only be provided at additional expense. Furthermore, the local computer and notification apparatus should connect in parallel with other telephone devices and there should be no requirement to modify the telephone transmission line wiring to the primary or secondary telephones.

OBJECTS AND ADVANTAGES

It is therefore an object of the present invention to provide an improved data communication system, that enables remote notification, at any time, to a local computer to initiate a connection to a data network.

It is a further object of this invention to provide data communication system, via non-dedicated telephone transmission lines, that allows normal operation of the telephone by the subscriber.

Another object of the invention is to avoid the need for the local computer or notification apparatus to answer remotely initiated notification calls and calls from outside persons intended for the subscriber, to avoid additional charges for calls when the telephone is unanswered by the subscriber, for example.

A further object of the invention is to avoid dependency on counts of rings or sequences of rings to avoid the requirement of timing the hang up of the remotely initiated call to cause a precise number of rings to occur on the local telephone transmission lines.

A still further object of the invention is to avoid dependency on alternative time-spacing of rings, distinctive ring types or signals sensed or transmitted while on-hook.

A yet further object of the invention is to connect in parallel with other telephone devices to avoid modification to the telephone transmission line wiring to the primary or secondary telephones.

Other objects, features, and advantages of the present invention will be apparent from a consideration of the drawings and ensuing description.

DRAWING FIGURES

The above objects and other novel features and advantages of the invention will be described in greater detail in the following detailed description with reference to the drawing figures in which.

SUMMARY

In accordance with the present invention, at a predetermined time or during a predetermined time range after a ring is detected on a telephone transmission line, the hook condition of the telephone transmission line is detected and if the telephone transmission line is not in use, a local computer dials out to a data network.

DESCRIPTION

Figure 1:
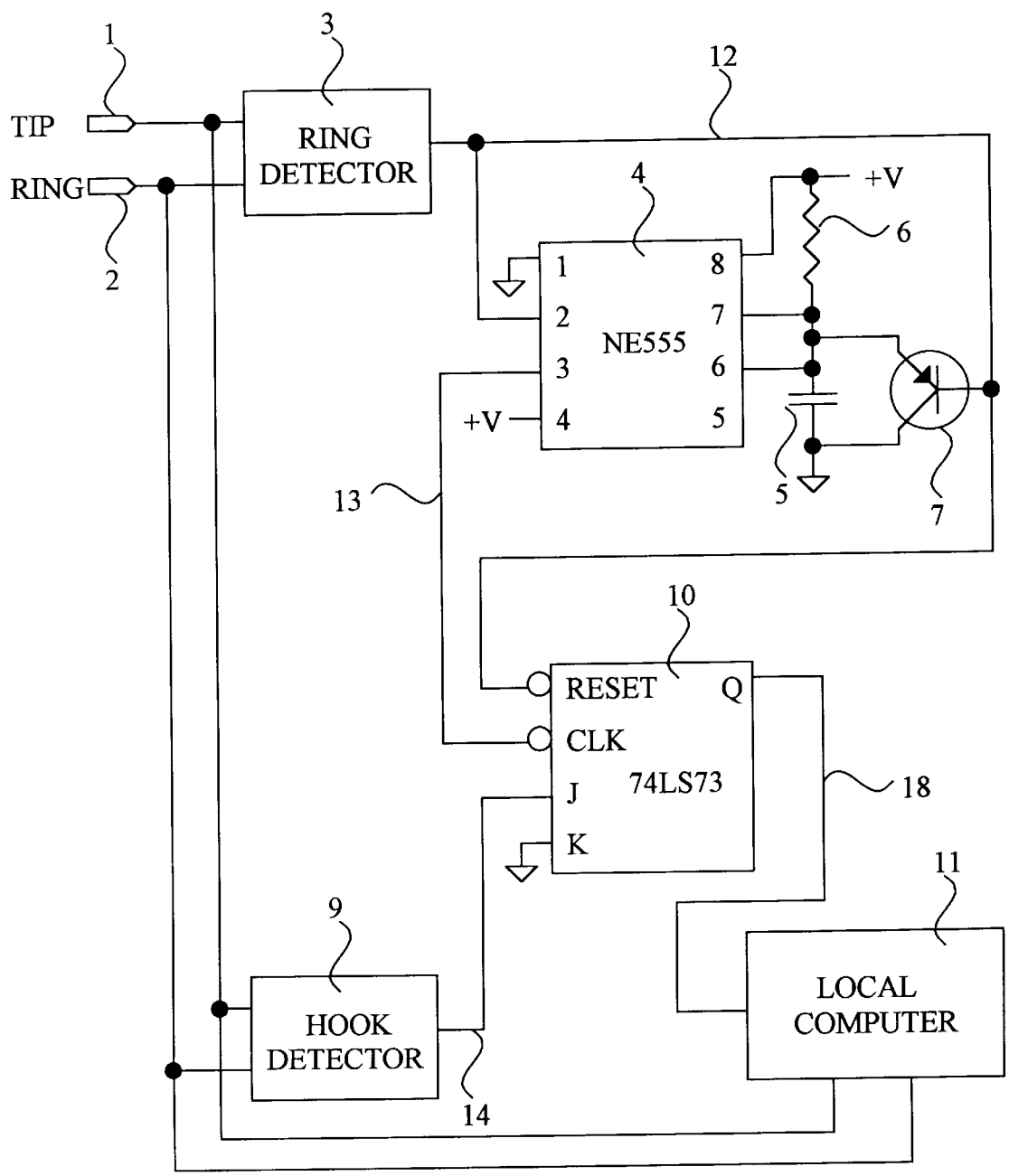
FIG. 1 is a schematic diagram of one embodiment of the present invention.

The notification system is used in conjunction with a telephone transmission line. In the preferred embodiment, the system is connected to a plain old telephone service (POTS) single line system via the tip connector 1 and ring connector 2 connected to a ring detector circuit 3 and a hook detector circuit 9 (FIG. 1). The ring detector circuit 3 detects ring voltages greater than 80 VAC. When such voltages occur, the ring detector 3 transmits one or more low-level voltage pulses on output line 12. When no such voltage conditions occur, the ring detector maintains a high-level voltage output line 12. The output line 12 is connected to the retriggerable timer circuit consisting of NE555 timer 4, capacitor 5, resistor 6 and transistor 7.

The NE555 timer normally transmits a low-level voltage on output line 13. A low-level voltage pulse on line 12 triggers the NE555 timer causing it to transmit a high-level signal on output line 13 and to begin charging the capacitor 5 through resistor 6. The capacitor and resistor are configured such that the capacitor voltage will reach the NE555 timer threshold voltage after a time delay period of 15 seconds. In the preferred embodiment, the capacitor has a value of 10 uF and the resistor a value of 1.5 Meg-ohms. When the capacitor voltage reaches this threshold, the NE555 timer 4 times out and transmits a low-level signal on output line 13.

In the preferred embodiment, if subsequent rings are detected, the ring detector circuit transmits subsequent low-level voltage pulses on line 12. If a low-level voltage is present on line 12 while the capacitor 5 is charging, the relatively low voltage on the base of transistor 7 causes the capacitor to discharge through the transistor, resetting the time delay period. When a high-level voltage is present at the base of transistor 7, the capacitor resumes charging. When ringing ceases, a high-level voltage on line 12 is continuously maintained, and the capacitor reaches the threshold voltage after a subsequent time delay period of 15 seconds. In another embodiment, transistor 7 is omitted and the capacitor 5 is not discharged during subsequent rings so that the capacitor 5 charges to the threshold voltage after a time delay period of 15 seconds after the first ring.

The hook detector circuit 9 detects the voltage differential between the tip connector 1 and ring connector 2. The hook status is defined as on-hook when the voltage differential is greater than 24 volts, and off-hook when such voltage differential is less than 24 volts. The hook detector circuit transmits a high-level voltage on output line 14 while an on-hook condition is detected and transmits a low-level voltage on output line 14 when an off-hook condition is detected. Output line 14 is connected to the J input of flip-flop 10.

Output line 13 is connected to the clock input of flip-flop 10. Output line 12 is connected to the reset input of flip-flop 10. When a low-level voltage is present on output line 12, the flip-flop transmits a low-level voltage on output line 18. The flip-flop will continue to transmit a low-level voltage on output line 18 until a high-level voltage is present on output line 12, indicating the absence of a ring burst, a high-level voltage is present on output line 14, indicating an on-hook condition, and output line 13 transitions from a high-level voltage to a low-level voltage, indicating the time delay period has elapsed. When all three conditions occur simultaneously, the flip-flop will transmit a high-level voltage on output line 18.

Output line 18 is connected to local computer 11, such as a personal computer, mainframe computer, computer-based telephone, or information appliance. The local computer monitors the voltage on output line 18. A transition on output line 18 from low-level voltage to high-level voltage causes the local computer to dial out to a data network.

Figure 2:
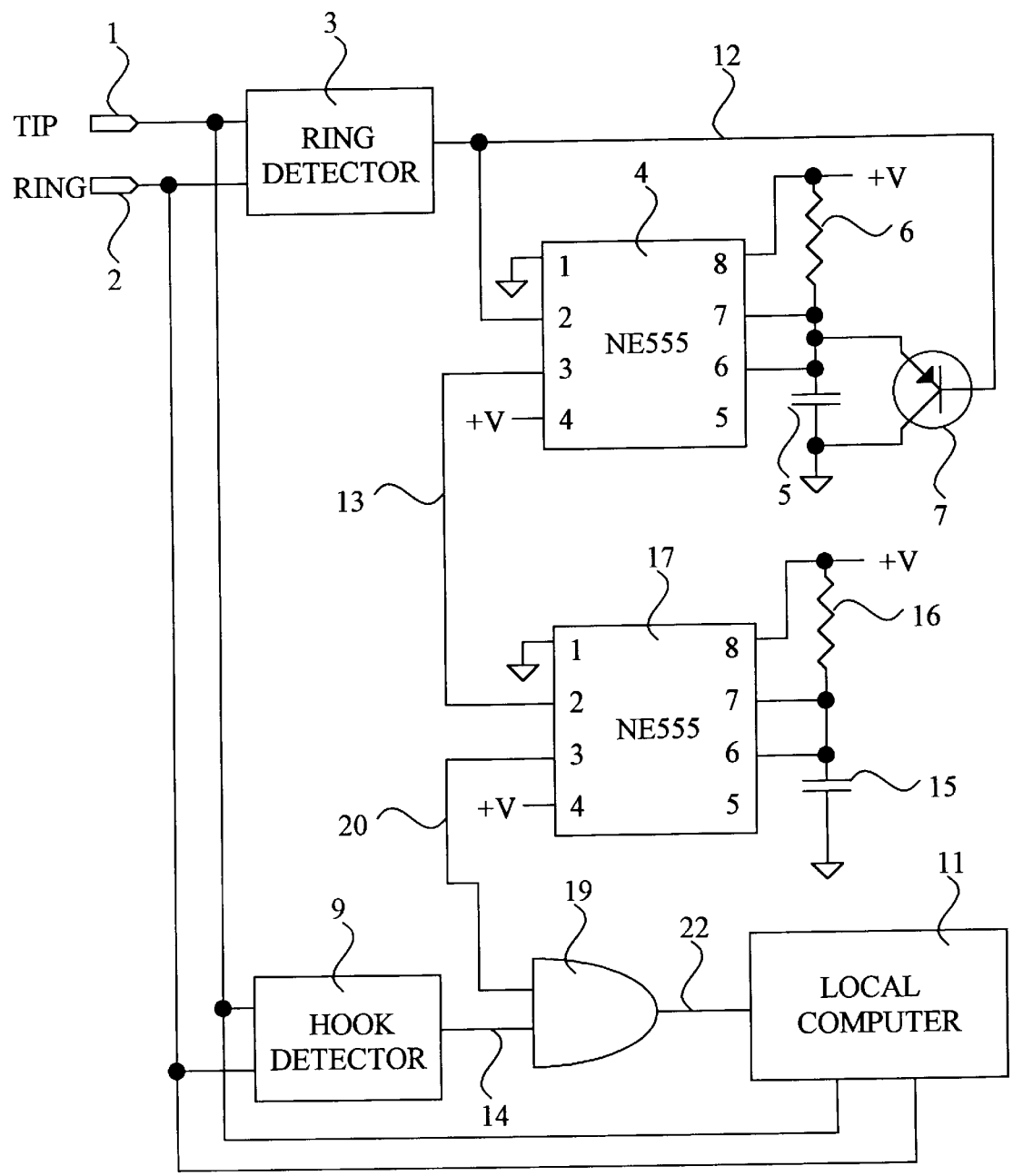
FIG. 2 is a schematic diagram of another embodiment of the present invention.

Another embodiment omits flip-flop 10 and includes timer 17, resistor 16, capacitor 15, and "AND" gate 19 (FIG. 2). The timer 17 normally transmits a low-level voltage on output line 20. A low-level voltage pulse on line 13 triggers the timer 17 causing it to transmit a high-level signal on output line 20 and to begin charging the capacitor 15 through resistor 16. The capacitor and resistor are configured such that the capacitor voltage will reach the timer 17 threshold voltage after a time delay period of 20 seconds. In the preferred embodiment, the capacitor has a value of 10 uF and the resistor a value of 2.0 Meg-ohms. When the capacitor voltage reaches this threshold, timer 17 times out and transmits a low-level signal on output line 20. Output line 20 is connected to "AND" gate 19. Output line 14 from hook detector 9 is also connected to "AND" gate 19. "AND" gate 19 transmits a high-level voltage on output line 22 if both output line 14 is at a high-level voltage, indicating an on-hook condition, and output line 20 is at a high-level voltage, indicating the timer 17 has triggered but the time delay period has not yet expired, otherwise "AND" gate 19 transmits a low-level voltage on output line 22.

Output line 22 is connected to local computer 11. The local computer monitors the voltage on output line 22. A transition on output line 22 from low-level voltage to high-level voltage causes the local computer to dial out to a data network. In another embodiment, transistor 7 is omitted and the capacitor 5 is not discharged during subsequent rings so that the capacitor 5 charges to the threshold voltage after a time delay period of 15 seconds after the first ring.

Figure 3:
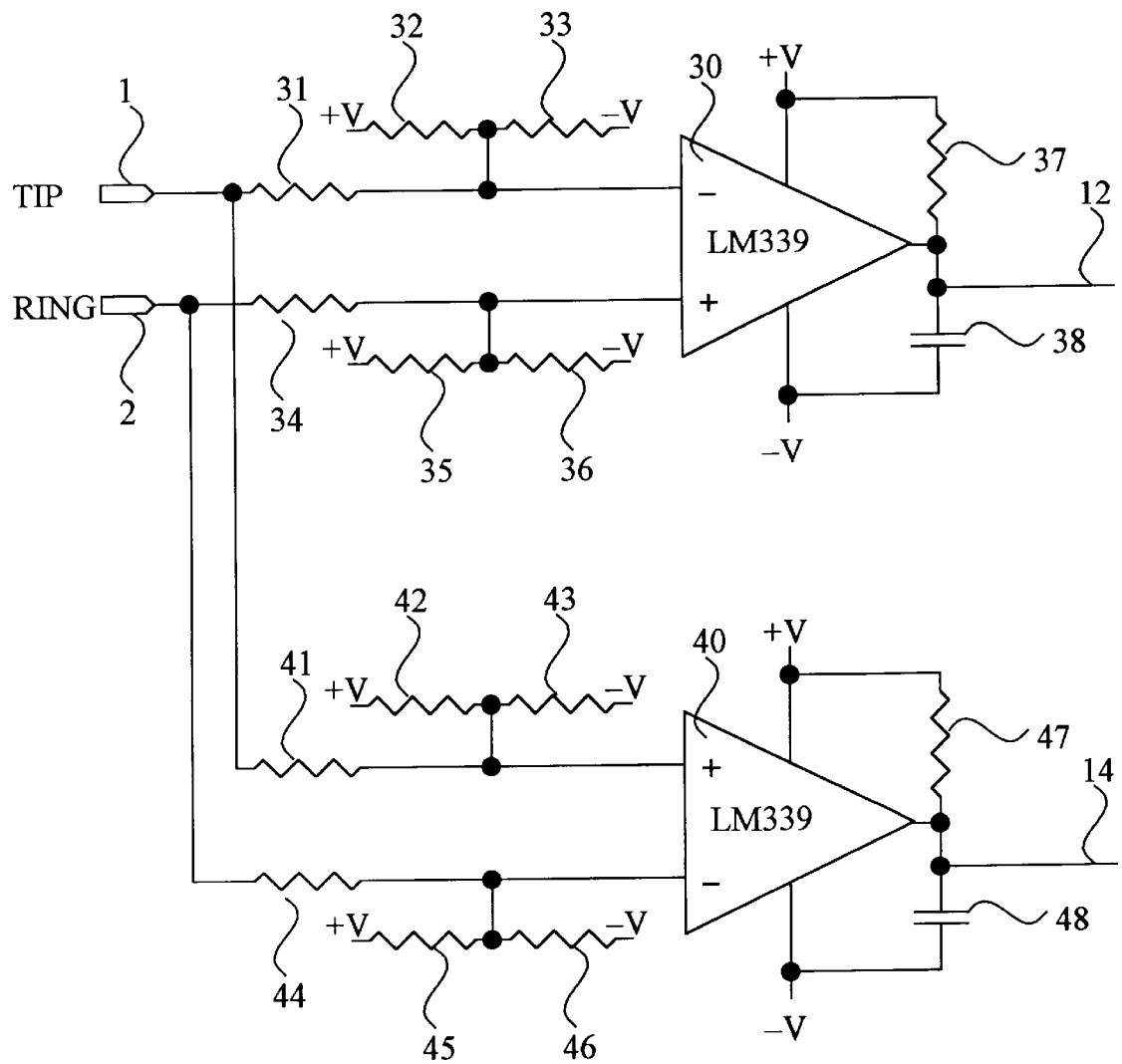
FIG. 3 is a schematic diagram of one embodiment of a ring detection and hook detection circuit for use in conjunction with the present invention.

The preferred embodiment for the ring detector 3 and hook detector 9 circuits is illustrated in FIG. 3. Tip connector 1 is connected through resistor 31 to bias resistors 32 and 33 and to the negative input of LM339 voltage comparator 30. Ring connector 2 is connected through resistor 34 to bias resistors 35 and 36 and to the positive input of voltage comparator 30. The bias resistors are configured to so that the voltage differential is indicative of a ring burst being present on the telephone transmission lines. When a ring burst is present, the voltage comparator 30 transmits a low-level voltage on output line 12, and when absent, transmits a high-level voltage on output line 12.

Tip connector 1 is also connected through resistor 41 to bias resistors 42 and 43 and to the positive input of voltage comparator 40. Ring connector 2 is also connected through resistor 44 to bias resistors 45 and 46 and to the negative input of LM339 voltage comparator 40. The bias resistors are configured to so that the voltage differential is indicative of the on/off hook condition present on the telephone transmission lines. When a primary or secondary telephone connected to the telephone transmission lines is off-hook, the voltage comparator transmits 40 a low-level voltage on output line 14, and when all primary and secondary telephones connected to the telephone transmission lines are on-hook, transmits a high-level voltage on output line 14. In another embodiment, the hook detector circuit is implemented as part of the telephone and detects the condition of the telephone's physical hook-switch. In another embodiment, the hook detector circuit is implemented as a circuit that detects the presence or absence of a dial tone or other tones or other sounds.

In one embodiment this notification apparatus is a standalone device coupling the telephone transmission line to the local computer. In another embodiment this notification apparatus is implemented as a component of the local computer, such as a personal computer, mainframe computer, computer-based telephone, or information appliance. In another embodiment this notification apparatus is implemented as a component of the local telephone.

CONCLUSION, RAMIFICATION, AND SCOPE

Accordingly, the reader will see that the present invention provides a data communication system with several advantages which include:

- enabling remote notification, at any time, to a local computer to initiate a connection to a data network.
- connection via non-dedicated telephone transmission lines, that allows normal operation of the telephone by the subscriber.
- avoiding the need for the local computer or notification apparatus to answer remotely initiated notification calls and calls from outside persons intended for the subscriber, to avoid additional charges for calls when the telephone is unanswered by the subscriber, for example.
- avoiding dependency on counts of rings or sequences of rings to avoid the requirement of timing the hang up of the remotely initiated call to cause a precise number of rings to occur on the local telephone transmission line.
- avoiding dependency on alternative time-spacing of rings, distinctive ring types or signals sensed or transmitted while on-hook.
- connecting in parallel with other telephone devices thus avoiding modification to the telephone transmission line wiring to the primary or secondary telephones.

The present invention finds application in many areas in which connection to the data network is via outbound rather than inbound calls, such as standard internet service providers and online information systems, as well as applications where it is preferable for the call to be charged as dialed by the local computer rather than, or in addition to, being dialed remotely. One such area, for instance, might be notification that electronic-mail, fax, page or other communiqué has been received by a remote computer, so that the local computer can retrieve it promptly. Another area might be notification of an event, for instance, an event monitored by a filter or agent program, such as a particular stock price reaching a predetermined level or the availability of a particular product or service, so that the local computer may report it promptly. Still another area might be notification that a person wishes to communicate to the user of the remote computer via text chat, voice, video, or other medium transmitted via the data network, so that the local computer may receive it and reply promptly. Yet another area might be notification that a remote computer wishes to configure or poll the local computer or devices attached to the local computer, such as lights or appliances. Although the invention is described for use with telephone transmission lines, it will be apparent to one skilled in the art that the invention can also be used with transmission media other than telephone transmission lines.

Although the description above contains many specificities, these should not be construed as limiting the scope of the invention but as merely providing illustrations of some of the presently preferred embodiments of this invention. It will, however, be evident that various modifications and changes may be made thereunto without departing from the broader spirit and scope of the invention as set forth in the appended claims. Many variations are possible. For example, the time period for each of the timers may vary from a very short period to an indefinitely long period. Also the circuit may be implemented using discrete components or custom integrated circuits or programmable logic or computer circuits. Thus the scope of the invention should be determined not by the embodiments illustrated, but by the appended claims and their legal equivalents.

What is claimed is:

1. A data communication system, comprising:
   a telephone transmission line;
   a ring detection means for detecting the presence of a ring burst on said telephone transmission line;
   a first timer means responsive to activity in the ring detection means, said first timer means timing out and producing an output at a predetermined time after activity in said ring detection means;

a second timer means responsive to activity in the first timer means, said second timer means producing an output for a predetermined time period after timing out of first timer means;

a hook detection means for detecting the on-hook condition of a local telephone instrument connected to said telephone transmission line;

a dialing means responsive to the output of said second timer means and said on-hook detection means, said dialing means initiating a connection from a local computer to a data network upon the presence of the on-hook condition indicated by said hook detection means and the presence of said output from second timer during said predetermined time period.

2. A data communication system according to claim 1 whereby said dialing of the local computer can be initiated without preventing normal operation of the local telephone instrument.

3. A data communication system according to claim 1 wherein said timer means is retriggered by subsequent activity in said ring detection means, said timer timing out and producing an output at a predetermined time after cessation of activity in said ring detection.

4. A method for notifying a local computer which connects to a data network via a telephone transmission line, said method comprising the steps of:

detecting one or more ring bursts occurring when said telephone transmission line is rung;

triggering a first timer when said ring burst is detected;

triggering a second timer when said first timer times out;

detecting inactive condition of said telephone transmission line;

dialing outbound to said data network over said telephone transmission line when said inactive condition is detected after triggering of said second timer and before said second timer times out.

5. A method based on claim 4 wherein said inactive condition is detected by detecting the on-hook condition of the telephone transmission line.

6. A method based on claim 5 wherein said first timer times out after a predetermined time period after the initial ring burst is detected.

7. A method based on claim 5 wherein said first timer times out after a predetermined time period after the cessation of ring burst is detected.

8. A method based on claim 5 wherein said first timer times out after a predetermined time period after a predetermined count of ring bursts are detected.

9. A method based on claim 4 wherein said inactive condition of said telephone transmission line is detected by comparing the differential line voltage to a predetermined value.

10. A method based on claim 4 wherein said first timer times out after a predetermined time period after the initial ring burst is detected.

11. A method based on claim 4 wherein said first timer times out after a predetermined time period after the cessation of ring burst is detected.

12. A method based on claim 4 wherein said first timer times out after a predetermined time period after a predetermined count of ring bursts are detected.

* * * * *